(12) United States Patent
Go

(10) Patent No.: US 11,142,076 B2
(45) Date of Patent: Oct. 12, 2021

(54) SOLAR CHARGING CONTROL DEVICE AND CHARGING CONTROL METHOD

(71) Applicant: TOYOTA JIDOSHA KABUSHIKI KAISHA, Toyota (JP)

(72) Inventor: Koichi Go, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 255 days.

(21) Appl. No.: 16/192,255

(22) Filed: Nov. 15, 2018

(65) Prior Publication Data

US 2019/0176629 A1    Jun. 13, 2019

(30) Foreign Application Priority Data

Dec. 11, 2017 (JP) .............................. JP2017-236824

(51) Int. Cl.
```
B60L 8/00       (2006.01)
H02J 7/35       (2006.01)
B60L 53/62      (2019.01)
G06Q 30/06      (2012.01)
B60L 53/30      (2019.01)
```
(Continued)

(52) U.S. Cl.
CPC ............... B60L 8/003 (2013.01); B60L 53/30 (2019.02); B60L 53/60 (2019.02); B60L 53/62 (2019.02); B60L 53/63 (2019.02); G06Q 30/0645 (2013.01); H02J 7/0027 (2013.01); H02J 7/35 (2013.01); B60L 58/10 (2019.02); B60L 58/12 (2019.02)

(58) Field of Classification Search
CPC ........ B60L 8/00; B60L 8/003; B60L 11/1838; B60L 53/60; B60L 53/62; B60L 53/63; B60L 58/12; B60L 58/10; H02J 7/35; H02J 7/0027; G06Q 30/0645
USPC ........................................................ 320/109
See application file for complete search history.

(56) References Cited

U.S. PATENT DOCUMENTS

| 2010/0017249 A1 | 1/2010 | Fincham et al. |
| 2010/0228405 A1* | 9/2010 | Morgal ................... B60L 53/68 701/2 |

(Continued)

FOREIGN PATENT DOCUMENTS

| JP | 2010-231258 A | 10/2010 |
| JP | 2014-011860 A | 1/2014 |
| JP | 2014-183670 A | 9/2014 |

Primary Examiner — Richard Isla
Assistant Examiner — Dung V Bui
(74) Attorney, Agent, or Firm — Oliff PLC

(57) ABSTRACT

A solar charging control device that controls a charged state of a plurality of vehicles connected to each other so that the vehicles are configured to transmit and receive power via a power network in a vehicle sharing system that uses vehicles each having a solar power generation device mounted therein includes an electronic control device. The electronic control device receives a reservation for use of the vehicle, manages rental and return of the vehicles based on the reservation for use, sets the vehicle of which the amount of charging of the battery satisfies a predetermined condition among the vehicles connected to the power network as a charging target vehicle, and manages power transmission and reception via the power network so that a battery of the charging target vehicle is able to be charged using a generation power of the solar power generation device mounted in another vehicle.

8 Claims, 4 Drawing Sheets

(51) Int. Cl.
  *H02J 7/00*  (2006.01)
  *B60L 53/63*  (2019.01)
  *B60L 53/60*  (2019.01)
  *B60L 58/10*  (2019.01)
  *B60L 58/12*  (2019.01)

(56) References Cited

U.S. PATENT DOCUMENTS

| | | | |
|---|---|---|---|
| 2011/0031816 A1* | 2/2011 | Buthker | H01L 31/02021 307/82 |
| 2012/0096885 A1* | 4/2012 | Mak | F25B 27/002 62/235.1 |
| 2013/0033111 A1* | 2/2013 | Kawamoto | G05F 1/67 307/66 |
| 2013/0067253 A1* | 3/2013 | Tsuda | H02J 3/008 713/300 |
| 2015/0239365 A1* | 8/2015 | Hyde | B60L 58/26 701/2 |
| 2015/0246649 A1* | 9/2015 | Brunbauer | H02K 7/1815 307/9.1 |
| 2016/0101704 A1* | 4/2016 | McCalmont | B60L 53/51 320/101 |
| 2016/0209857 A1* | 7/2016 | Nakasone | H02J 7/0068 |
| 2017/0063104 A1* | 3/2017 | Bean | H02J 7/007 |
| 2017/0136894 A1* | 5/2017 | Ricci | B60L 53/38 |
| 2017/0229908 A1* | 8/2017 | Beer | H02J 13/0079 |
| 2017/0246962 A1* | 8/2017 | Weber | B60L 53/12 |

\* cited by examiner

FIG. 3

| VEHICLE | USE STATE | DETERMINATION PROCESS | BATTERY STATE | POWER PROVISION | USE OF SOLAR GENERATION POWER |
|---|---|---|---|---|---|
| A | IN USE | - | - | - | - |
| B | UNUSED | COMPLETED | FULLY CHARGED | OK | POWER TRANSMISSION TO OTHER VEHICLE |
| C | UNUSED | COMPLETED | NOT FULLY CHARGED | NG | CHARGE SUBJECT VEHICLE |
| D | UNUSED | COMPLETED | NOT FULLY CHARGED | OK | CHARGING USING SUBJECT VEHICLE AND OTHER VEHICLE |
| E | UNUSED | NOT COMPLETED | - | OK | POWER TRANSMISSION TO OTHER VEHICLE |

SOLAR CHARGING CONTROL DEVICE AND CHARGING CONTROL METHOD

INCORPORATION BY REFERENCE

The disclosure of Japanese Patent Application No. 2017-236824 filed on Dec. 11, 2017 including the specification, drawings and abstract is incorporated herein by reference in its entirety.

BACKGROUND

1. Technical Field

The present disclosure relates to a solar charging control device and a charging control method for controlling charging using power generated by a solar power generation device.

2. Description of Related Art

Japanese Unexamined Patent Application Publication No. 2014-183670 (JP 2014-183670 A) discloses an in-vehicle power system efficiently using power generated by a solar power generation device.

SUMMARY

Vehicles each having a solar power generation device mounted therein may be used for a vehicle sharing system that lends vehicles according to a use schedule. In this case, when there is not enough time from return to rental of a vehicle, it is difficult for a battery to be brought to a fully charged state by the next reserved rental time solely with a solar power generation device of which generation power is low. Therefore, plug-in charging is preferentially used as compared with solar charging. Vehicles that have not been rented, of which batteries have already been fully charged, are not needed to be charged by the next reserved rental time. Therefore, obtained solar generation power is discarded without being used for charging.

As described above, in the vehicle sharing system using a plurality of vehicles each having a solar power generation device mounted therein in the related art, it is not possible to effectively utilize the solar generation power of each vehicle. Therefore, it is desired to develop a technology capable of effectively utilizing the solar generation power of each vehicle.

The present disclosure provides a solar charging control device and a charging control method capable of effectively utilizing solar generation power of each vehicle in a vehicle sharing system using a plurality of vehicles each having a solar power generation device mounted therein.

A first aspect of the present disclosure relates to a solar charging control device that controls a charged state of a plurality of vehicles connected to each other so that the vehicles are configured to transmit and receive power via a power network in a vehicle sharing system that uses the vehicles each having a solar power generation device. The solar charging control device includes an electronic control device. The electronic control device is configured to receive a reservation for use of the vehicle and manage rental and return of the vehicle based on the reservation for use, set the vehicle of which the amount of charging of a battery satisfies a predetermined condition among the vehicles connected to the power network as a charging target vehicle, and manage power transmission and reception via the power network so that the battery of the charging target vehicle is charged using generation power of the solar power generation device mounted in another vehicle.

With the solar charging control device according to the first aspect of the disclosure, the battery of the charging target vehicle is charged with the solar generation power of the other vehicle, in addition to the solar generation power of a subject vehicle. Accordingly, it is possible to transmit and receive the solar generation power among a plurality of vehicles and effectively utilize power obtained through solar power generation in each vehicle.

In the solar charging control device according to the first aspect of the disclosure, when there are the vehicles of which the amount of charging of the battery satisfies the predetermined condition, the electronic control device may set the vehicle that is reserved to be used at the earliest reserved use time, as the charging target vehicle.

With the solar charging control device according to the first aspect of the present disclosure, the vehicle that is reserved to be used at the earliest reserved use time (rental time) is estimated to be a vehicle of which the amount of charging of the battery is large and is preferentially set as the charging target vehicle. Accordingly, a probability of the vehicle of which the battery is brought to a fully charged state to be lent to a user becomes high.

In the solar charging control device according to the first aspect of the disclosure, the electronic control device may be further configured to predict amount of generation power in the solar power generation device. The electronic control device may be configured to set the vehicle of which the battery is able to be brought to a fully charged state by a reserved use time among the vehicles connected to the power network, as the charging target vehicle, based on the amount of charging of the battery, a charging available period up to the reserved use time, and the predicted amount of generation power. In the solar charging control device according to the first aspect of the present disclosure, the electronic control device may be configured to predict amount of generation power based on at least the amount of solar radiation, temperature, and performance of a solar panel.

With the solar charging control device according to the first aspect of the present disclosure, a vehicle of which a battery can be brought to the fully charged state by a reserved use time (rental time) of the vehicle is preferentially set as the charging target vehicle. Accordingly, it is possible to lend the vehicle of which the battery has been reliably brought to the fully charged state.

In the solar charging control device according to the first aspect of the present disclosure, the electronic control device may be configured to stop power transmission to the charging target vehicle using the power network and to set a new charging target vehicle, in response to completion of the charging of the battery of the vehicle, new reception of a reservation for use for the vehicle in the electronic control device, or a connection of the vehicle to the power network due to return of the vehicle.

With the solar charging control device according to the first aspect of the present disclosure, when an event such as completion of charging, new reception of a reservation for use, or return of a vehicle occurs, the charging target is set again. Therefore, it is possible to rapidly switch between the charging target vehicles when there is a vehicle to be prioritized over a vehicle of which charging is being executed.

A second aspect of the disclosure relates to a charging control method that is executed by a solar charging control device that controls a charged state of a plurality of vehicles connected to each other so that the vehicles are able to transmit and receive power via a power network in a vehicle sharing system that uses the vehicles each having a solar power generation device. The charging control method includes receiving a reservation for use of the vehicle and managing rental and return of the vehicle based on the reservation for use; and setting the vehicle of which the amount of charging of a battery satisfies a predetermined condition among the vehicles connected to the power network as a charging target vehicle, and managing power transmission and reception via the power network so that the battery of the charging target vehicle is charged using generation power of the solar power generation device mounted in another vehicle.

With the charging control method according to the second aspect of the present disclosure, it is also possible to transmit and receive the solar generation power among a plurality of vehicles and effectively utilize power obtained through solar power generation in each vehicle.

In the charging control method according to the second aspect of the disclosure, when there are the vehicles, each of which the amount of charging of the battery satisfies the predetermined condition, the vehicle that is reserved to be used at the earliest reserved time may be set as the charging target vehicle.

The charging control method according to the second aspect of disclosure may further include predicting amount of generation power in the solar power generation device; and setting the vehicle of which the battery is able to be brought to a fully charged state by a reserved use time among the vehicles connected to the power network as the charging target vehicle based on the amount of charging of the battery, a charging available period up to the reserved use time, and the predicted amount of generation power.

In the charging control method according to the second aspect of disclosure, power transmission to the charging target vehicle using the power network may be stopped and a new charging target vehicle may be set, in response to completion of the charging of the battery of the vehicle, new reception of a reservation for use for the vehicle, or a connection of the vehicle to the power network due to return of the vehicle.

In the charging control method according to the second aspect of disclosure, amount of generation power may be predicted based on at least the amount of solar radiation, temperature, and performance of a solar panel.

With the solar charging control device and the charging control method according to the aspects of the present disclosure, it is possible to effectively utilize the solar generation power of each vehicle in a vehicle sharing system that uses a plurality of vehicles each having a solar power generation device mounted therein.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a table illustrating a state of a vehicle that is classified by a charging control process.

DETAILED DESCRIPTION OF EMBODIMENTS

Overview

A solar charging control device and a charging control method according to the embodiment are used for, for example, a vehicle sharing system that lends a plurality of vehicles each having a solar power generation device mounted therein according to a use schedule. In the solar charging control device, a battery of a set charging target vehicle is charged with solar generation power of another vehicle as well as solar generation power of a subject vehicle. Accordingly, it is possible to transmit and receive the solar generation power among a plurality of vehicles and effectively utilize power obtained through solar power generation in each vehicle.

Configuration of Vehicle Sharing System

Figure 1:
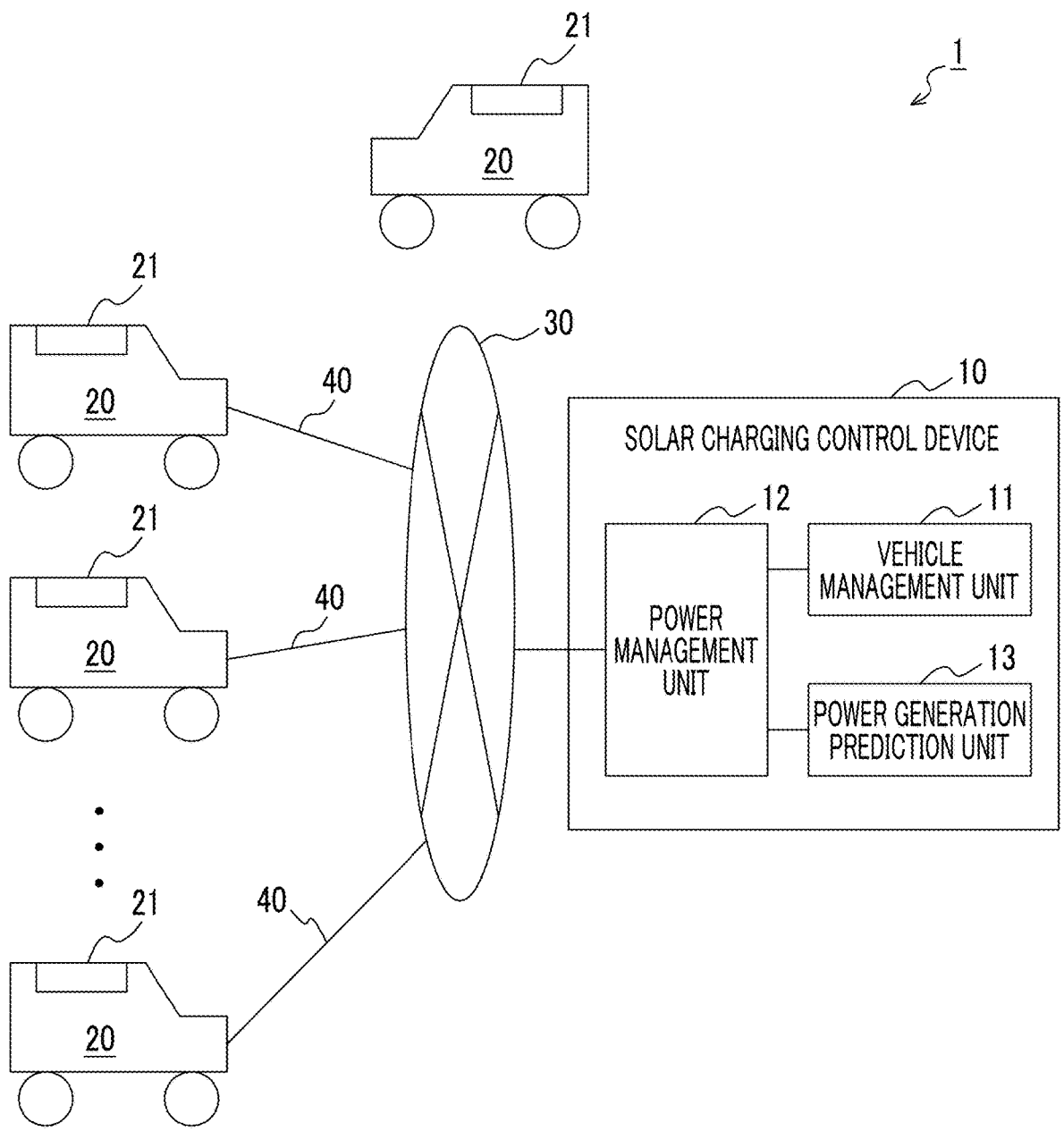
FIG. 1 is a diagram illustrating a schematic configuration of a vehicle sharing system including a solar charging control device according to an embodiment of the present disclosure.

FIG. 1 is a diagram illustrating a schematic configuration of a vehicle sharing system 1 including a solar charging control device 10 according to an embodiment of the present disclosure. The vehicle sharing system 1 illustrated in FIG. 1 includes a solar charging control device 10 of the embodiment, a plurality of vehicles 20, and a power network 30.

The vehicles 20 are, for example, hybrid vehicles, electric vehicles, and the like, each of which a battery can be charged through plug-in power supply. Each of the vehicles 20 includes a solar power generation device 21 mounted therein capable of charging a battery with power generated by a solar panel (hereinafter referred to as "solar generation power").

The vehicles 20 are connected to the power network 30 via a charging cable 40 so that power can be transmitted and received. The power network 30 can be constructed by, for example, a power supply facility included in a base station that performs rental and return of the vehicle 20. The vehicle 20 connected to the power network 30 can execute any one of the following power provision and reception processes through switching according to a charging command that is transmitted from the solar charging control device 10.

(1) Power of a plug-in charger (not illustrated) is received from the power network 30.

(2) Solar generation power of the subject vehicle is transmitted to the power network 30.

(3) Solar generation power of another vehicle is received from the power network 30.

The solar charging control device 10 is configured to be able to control a charged state of the vehicles 20 connected to each other via the power network 30. The solar charging control device 10 includes a vehicle management unit 11, a power management unit 12, and a power generation prediction unit 13.

The vehicle management unit 11 manages rental and return of a vehicle with respect to the vehicles 20. The vehicle management unit 11 optimally manages the rental and return of the vehicles 20 based on a reservation for use of a vehicle (hereinafter referred to as a "reservation for use of a vehicle") that is received from a user or the like participating in the vehicle sharing system 1. For example, when the vehicle management unit 11 receives the reservation for use of a vehicle, the vehicle management unit 11 can decide a vehicle having the largest amount of charging of a battery among unused vehicles not lent to users, to be a vehicle to be assigned to the received reservation for use.

The power management unit 12 manages and controls the amount of charging of the battery of the unused vehicles not lent to users with respect to the vehicles 20. Specifically, the power management unit 12 manages whether or not the solar generation power generated by the solar power generation device 21 for each vehicle 20 can be transmitted to the power network 30, that is, whether or not the solar generation power can be provided to other vehicles. In the management, a determination is made that provision of the solar generation power is possible (hereinafter referred to as "power provision OK") when the battery is in a fully charged state.

The power management unit 12 sets a vehicle of which the amount of charging of the battery satisfies a predetermined condition among the unused vehicles connected to the power network 30 without being lent to users, as charging target vehicle, and controls power transmission/reception among the vehicles via the power network 30 so that the battery of the set charging target vehicle can be charged using the solar generation power generated by the solar power generation device 21 mounted on the other vehicle corresponding to the power provision OK. The above-described control is realized by transmitting a predetermined charging command to each vehicle 20.

The power generation prediction unit 13 predicts an expected value of the power generated by the solar power generation device 21 based on performance of the solar power generation device 21 mounted on each vehicle 20, the amount of solar radiation, and the like. For example, the expected value of the solar generation power can be obtained through calculation of (total amount of solar radiation received by a solar panel during a predetermined period of time)×(power generation rating of the solar panel)×(efficiency coefficient regarding temperature or control). The total amount of solar radiation can be estimated from information such as weather forecast of the day or past weather statistics data. The information may be held by the solar charging control device 10 or may be acquired from a predetermined data center via a communication network.

All or part of the solar charging control device 10 described above can be typically configured as an electronic control unit (ECU) including a central processing unit (CPU), a memory, and an input and output interface. In the electronic control unit, the predetermined functions described above are realized by the CPU reading and executing a program stored in a memory.

Control Executed by Solar Charging Control Device

Figure 2:
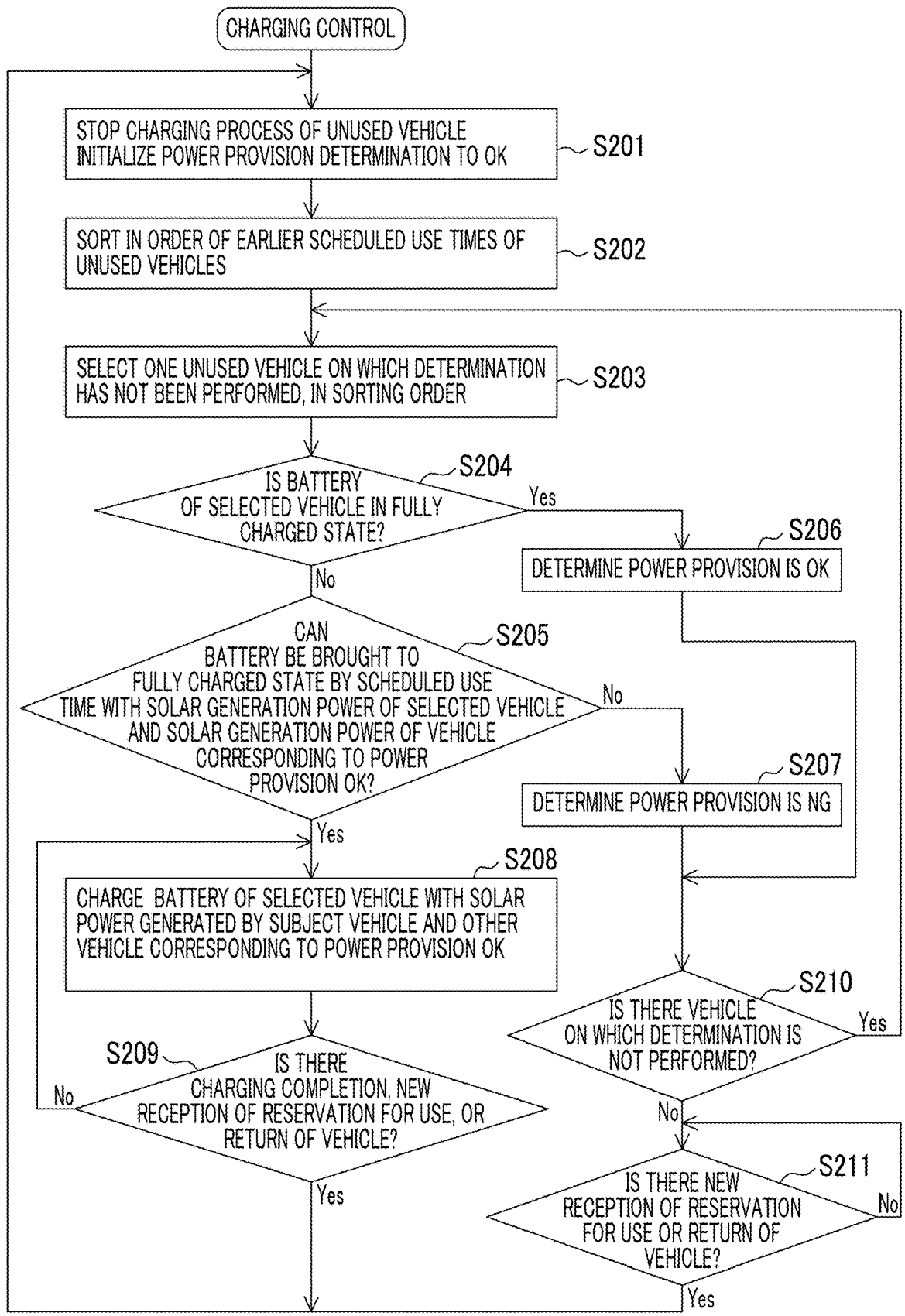
FIG. 2 is a flowchart showing a processing procedure of charging control that is performed by the solar charging control device according to the embodiment.

Control that is executed by the solar charging control device 10 according to an embodiment of the present disclosure will be described further with reference to FIG. 2. FIG. 2 is a flowchart showing a charging control process procedure that is performed by the solar charging control device 10 according to the embodiment.

The above-described charging control is a process targeted at the unused vehicles that are not lent to users and are connected to the power network 30 among the vehicles 20, and continues to be repeatedly executed while the vehicle sharing system 1 is in operation.

In step S201, when a charging process is being executed for unused vehicles, the charging process is stopped. All determinations as to whether or not provision of power of the unused vehicles is possible are reset to be initialized to power provision OK. This is because the above-described initialization is intended for the solar generation power to be able to be provided from the other remaining vehicles 20 to any one of the vehicles 20 of which charging is number one priority.

In step S202, the unused vehicles are rearranged (sorted) in an order of earlier scheduled use times of the unused vehicles. The rearranging order described above is an order in which a determination process as to whether or not the unused vehicle corresponds to a charging control target is performed.

In step S203, according to the rearranging order (sorting order), one unused vehicle on which the determination process as to whether or not the unused vehicle corresponds to the charging control target has not yet been performed is selected. Hereinafter, the selected unused vehicle is referred to as a "selected vehicle".

In step S204, a determination is made as to whether or not a battery of the selected vehicle is in the fully charged state. The fully charged state of the battery means, for example, that the amount of charging (a state of charge (SOC)) of the battery has reached an upper limit threshold, which is provided for prevention of overcharging. When the battery of a selected vehicle is in the fully charged state (Yes in S204), the process proceeds to step S206. When the battery of the selected vehicle is not in the fully charged state (No in S204), the process proceeds to step S205.

In step S205, when the battery of the selected vehicle is not in the fully charged state, a determination is made as to whether or not the battery of the selected vehicle can be brought to the fully charged state by the scheduled use time of the selected vehicle by the solar generation power of the selected vehicle and the solar generation power of the other vehicle of power provision OK. The above-described determination is performed based on whether or not the battery of the selected vehicle can be charged from the current amount of charging to the amount of full charging according to a total sum of expected solar generation power values of all the other vehicles corresponding to the power provision OK and an expected solar generation power value of the subject vehicle predicted to be able to be acquired by the scheduled use time of the selected vehicle.

When the battery of the selected vehicle can be brought to the fully charged state (Yes in S205), the process proceeds to step S208 and when the battery of the selected vehicle cannot be brought to the fully charged state (No in S205), the process proceeds to the step S207.

In step S206, when the battery of the selected vehicle is in the fully charged state, the selected vehicle is not the charging control target but can supply the solar generation power to other vehicles, and therefore, the selected vehicle is determined to correspond to the power provision OK.

In step S207, when the battery of the selected vehicle cannot be brought to the fully charged state by the scheduled use time of the selected vehicle, the selected vehicle does not correspond to the charging control target and the solar generation power is used for charging of the battery of the subject vehicle (the selected vehicle). Therefore, the selected vehicle is determined to be unable to provide the solar generation power (hereinafter referred to as "power provision NG").

In step S208, when the battery of the selected vehicle can be brought to the fully charged state by the scheduled use time of the selected vehicle, the selected vehicle is set as the charging target vehicle. In the charging target vehicle, charging of the battery of the subject vehicle (the charging target vehicle) with the solar generation power generated by the solar generation power of the subject vehicle and the other vehicle which is transmitted from the other vehicle corresponding to the power provision OK via the power network 30 is started.

In step S209, when charging of the battery of the charging target vehicle is started, a determination is made as to whether or not charging of the battery has been completed in any one of the vehicles 20, whether or not a new reservation for use of the vehicle 20 has been received, and whether or not return of a rented used vehicle 20 has been performed (whether the used vehicle 20 has been connected to the power network 30). When there is at least one action among completion of charging of the battery, the reception of new reservation for use, and the return of the vehicle (Yes in S209), the process returns to step S201, and when there is no action (No in S209), the process returns to step S208 and charging of the battery of the charging target vehicle continues to be executed.

In step S210, a determination is made as to whether or not there is an unused vehicle on which the determination process as to whether or not the unused vehicle corresponds to the charging control target has not yet been performed. When there is an unused vehicle on which the determination process has not yet been performed (Yes in S210), the process returns to step S203, and when there is no unused vehicle that the determination process has not yet been performed (No in S210), the process proceeds a process of to S211.

In step S211, when the determination process has been performed on all the unused vehicles, a determination is made as to whether or not a new reservation for use of the vehicle 20 has been received, and whether or not return of the rented used vehicle 20 has been performed (whether the used vehicle has been connected to the power network 30). When there is at least one action between the reception of a new reservation for use and the return of a vehicle (Yes in S211), the process returns to step S201, and when there is no action (No in S211), the process returns to step S211 and the determination is repeatedly performed.

FIG. 3 illustrates states of vehicles classified through the charging control process of steps S203 to S208 described above.

Vehicle A is a used vehicle lent to a user and does not correspond to a charging control processing target. Vehicle B is an unused vehicle on which the determination process has been performed, and a battery of vehicle B is in a fully charged state. Therefore, vehicle B corresponds to power provision OK, and transmits solar generation power to another vehicle. The power is effectively utilized. Vehicle C is an unused vehicle on which the determination process has been performed. A battery of vehicle C is not in a fully charged state, and cannot be brought to the fully charged state by the scheduled use time even when the solar generation power of the subject vehicle and other vehicles is concentrated on the vehicle C. Therefore, power provision NG is set, and the battery of the subject vehicle is charged solely with the solar generation power of the subject vehicle (can be charged through plug-in charging in parallel). Vehicle D is an unused vehicle on which the determination process has been performed. It is estimated that a battery of the subject vehicle is not fully charged and it is possible to bring one vehicle to a fully charged state by the scheduled use time when the solar generation power of the subject vehicle and another vehicle is concentrated on the subject vehicle. Therefore, vehicle D is set as the charging target vehicle and the battery of the subject vehicle is charged with both of the solar generation power of the subject vehicle and the other vehicle. Vehicle E is an unused vehicle on which the determination process has not been performed. In this case, vehicle E corresponds to the power provision OK (initial setting) and transmits the solar generation power to another vehicle, thereby effectively utilizing the power.

Figure 4:
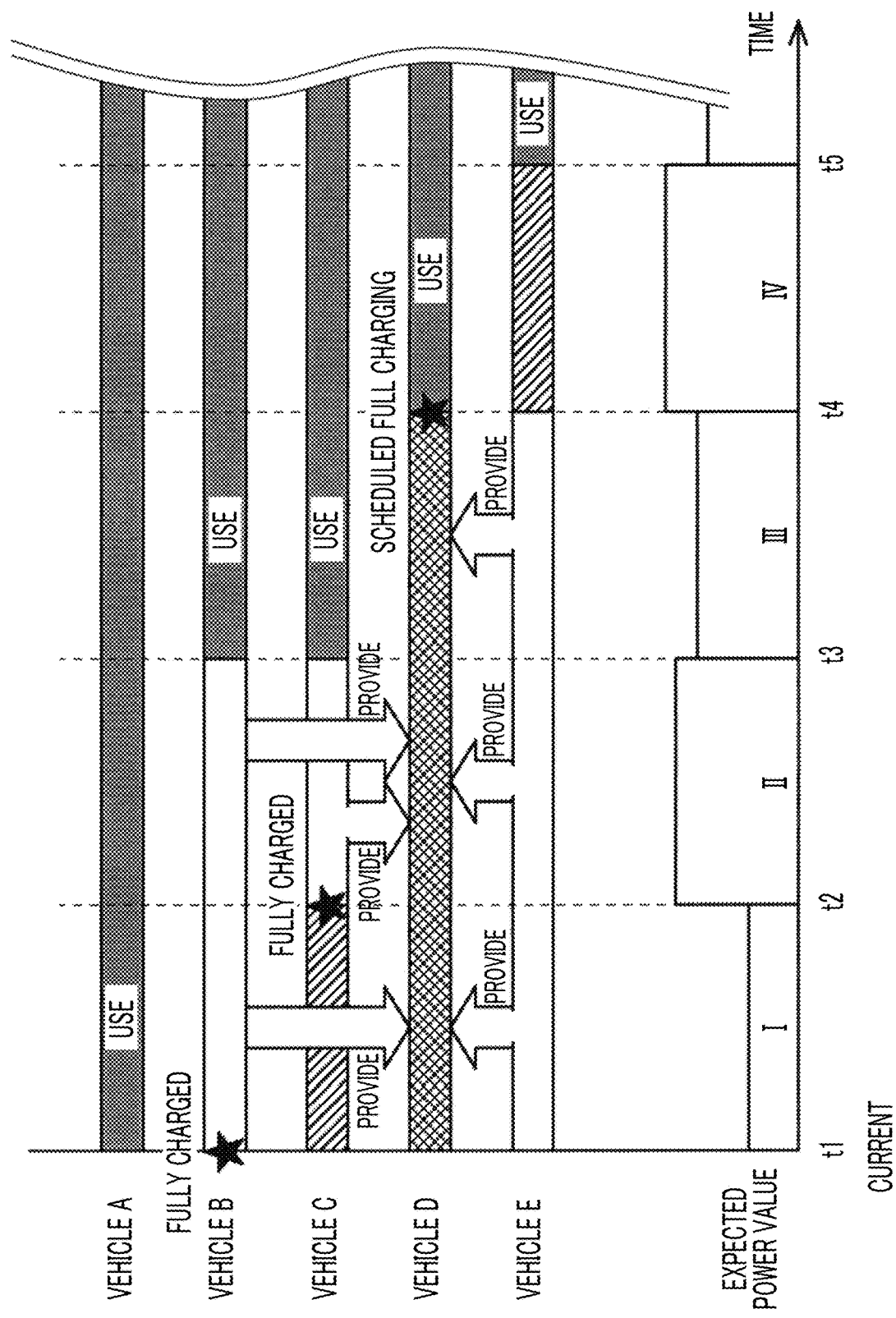
FIG. 4 is a diagram illustrating an example of power provision and reception that is performed between vehicles.

FIG. 4 illustrates a state of power provision and reception that is performed among vehicles A to E that are in a state described with reference to FIG. 3. Times t1 to t5 are, for example, minimum units in which a reservation for vehicles is possible. Since vehicle A is a used vehicle already lent at time t1, vehicle A is not a target of the charging control process.

At time t1, vehicle B is determined to correspond to power provision OK since the battery of vehicle B is in a fully charged state. In case of vehicle C, since a determination has been made that a battery of vehicle C cannot be brought to a fully charged state with an expected solar generation power value (I+II) by reserved use time t3, vehicle C is determined to correspond to power provision NG. In case of vehicle D, since a determination has been made that a battery of vehicle D can be brought to a fully charged state with an expected solar generation power value (I+II+III) by reserved use time t4, vehicle D is set as the charging target vehicle. Vehicle E is determined to correspond to power provision OK as in an initial setting. According to the decision and the determination described above, vehicle B and vehicle E corresponding to power provision OK provide the solar generation power to vehicle D which is the charging target vehicle.

At time t2, since the battery of vehicle C has been brought to a fully charged state by the solar generation power of the subject vehicle and plug-in charging, vehicle C is determined to correspond to power provision OK. Accordingly, all the charging processes are stopped and the charging control process is executed. As a result of the process, vehicle D is continuously set as the charging target vehicle. According to the decision and the determination described above, vehicles B, C, E corresponding to the power provision OK provide the solar generation power to the vehicle D which is the charging target vehicle.

At time t3, since the reserved use time has been reached for vehicles B and C, the provision of the solar generation power to vehicle D which is the charging target vehicle is ended and vehicles B and C are lent to a user. Vehicle E corresponding to the power provision OK continues to provide the solar generation power to vehicle D which is the charging target vehicle.

At time t4, since the battery of vehicle D has been brought to a fully charged state as scheduled and vehicle D has reached a reserved use time, a charging process is stopped and vehicle D is lent to the user. Accordingly, all the charging processes are stopped and the charging control process is executed. As a result of the process, the vehicle E is set as the charging target vehicle, but since there is no other vehicle corresponding to the power provision OK, the battery is charged with the solar generation power of the subject vehicle and using plug-in charging.

At time t5, vehicle E has reached a reserved use time. Therefore, charging is ended irrespective of whether or not vehicle E is in a fully charged state, and vehicle E is lent to the user.

Operation and Effects in Embodiment

With the solar charging control device 10 and the charging control method according to the embodiment of the present disclosure described above, the battery of the charging target vehicle set through the charging control process is charged with solar generation power of the other vehicle corresponding to the power provision OK, in addition to the solar generation power of the subject vehicle. Accordingly, it is possible to transmit and receive the solar generation power among the vehicles 20 and effectively utilize power obtained through solar power generation in each vehicle 20.

With the solar charging control device 10 and the charging control method according to the embodiment, when there are the vehicles 20 of which the amount of charging of the battery can be brought to the fully charged state by the reserved use time, the vehicle 20 that is reserved to be used at the earliest reserved use time is set as the charging target vehicle. Accordingly, since it is possible to preferentially set the vehicle of which the amount of charging of the battery is estimated to be large, as the charging target vehicle, a probability of the vehicle 20 of which the battery is brought to a fully charged state to be lent to a user becomes high.

With the solar charging control device 10 and the charging control method according to the embodiment, the power generation prediction unit 13 predicts the solar generation power in the solar power generation device 21, and sets the vehicle 20 of which the battery is brought to a fully charged state by the reserved use time as the charging target vehicle. Accordingly, since the vehicle of which the battery can be brought to a fully charged state can be preferentially set as the charging target vehicle, the vehicle 20 of which the battery has been reliably brought to a fully charged state can be lent to a user.

Further, with the solar charging control device 10 and the charging control method according to the embodiment, power transmission to the charging target vehicle performed by the power network 30 is stopped and a new charging target vehicle is et, in response to occurrence of an event such as the completion of charging of the battery of any one of the vehicles 20, the reception of a new reservation for use of a vehicle in the vehicle management unit 11, or a connection of the vehicle 20 to the power network 30 due to return of the vehicle 20. Thus, each time an event occurs, the charging target vehicle is set again. Therefore, it is possible to rapidly switch between charging target vehicles when there is a vehicle to be prioritized over a vehicle of which charging is being executed.

The solar charging control device and the charging control method according to the embodiments of the present disclosure can be used for, for example, a vehicle sharing system that lends a plurality of vehicles each having a solar power generation device mounted therein according to a use schedule.

What is claimed is:

1. A solar charging control device that controls a charged state of a plurality of vehicles connected to each other so that the vehicles are configured to transmit and receive power via a power network in a vehicle sharing system that uses the vehicles, each having a solar power generation device, the solar charging control device comprising:
an electronic control device configured to:
receive a reservation for use of a vehicle and manage rental and return of the vehicle based on the reservation for use;
select, from among the vehicles connected to the power network, a charging target vehicle that has a battery of which an amount of charging satisfies a predetermined condition;
manage power transmission and reception via the power network so that the battery of the charging target vehicle is charged using generation power of the solar power generation device mounted in another vehicle;
predict an amount of generation power in the solar power generation device; and
set the vehicle of which the battery is able to be brought to a fully charged state by a reserved use time among the vehicles connected to the power network, as the charging target vehicle, based on the amount of charging of the battery, a charging available period up to the reserved use time, and the predicted amount of generation power.

2. The solar charging control device according to claim 1, wherein when there are the vehicles, each of which the amount of charging of the battery satisfies the predetermined condition, the electronic control device sets the vehicle that is reserved to be used at the earliest reserved use time, as the charging target vehicle.

3. The solar charging control device according to claim 1, wherein the electronic control device is configured to stop power transmission to the charging target vehicle using the power network and to set a new charging target vehicle, in response to completion of the charging of the battery of the vehicle, new reception of a reservation for use for the vehicle in the electronic control device, or a connection of the vehicle to the power network due to return of the vehicle.

4. The solar charging control device according to claim 1, wherein the electronic control device is configured to predict the amount of generation power based on at least an amount of solar radiation, temperature, and performance of a solar panel.

5. A charging control method that is executed by a solar charging control device that controls a charged state of a plurality of vehicles connected to each other so that the vehicles are configured to transmit and receive power via a power network in a vehicle sharing system that uses the vehicles, each having a solar power generation device, the charging control method comprising:
receiving a reservation for use of a vehicle and managing rental and return of the vehicle based on the reservation for use;
selecting, from among the vehicles connected to the power network, a charging target vehicle that has a battery of which an amount of charging satisfies a predetermined condition;
managing power transmission and reception via the power network so that the battery of the charging target vehicle is charged using generation power of the solar power generation device mounted in another vehicle;
predicting an amount of generation power in the solar power generation device; and
setting the vehicle of which the battery is able to be brought to a fully charged state by a reserved use time among the vehicles connected to the power network as the charging target vehicle based on the amount of charging of the battery, a charging available period up to the reserved use time, and the predicted amount of generation power.

6. The charging control method according to claim 5, wherein when there are the vehicles, each of which the amount of charging of the battery satisfies the predetermined condition, the vehicle that is reserved to be used at the earliest reserved use time is set as the charging target vehicle.

7. The charging control method according to claim 5, wherein power transmission to the charging target vehicle using the power network is stopped and a new charging target vehicle is set, in response to completion of the charging of the battery of the vehicle, new reception of a reservation for use for the vehicle, or a connection of the vehicle to the power network due to return of the vehicle.

8. The charging control method according to claim 5, wherein the amount of generation power is predicted based on at least an amount of solar radiation, temperature, and performance of a solar panel.

\* \* \* \* \*